Nov. 12, 1957  M. P. WINTHER  2,812,670
HYDROMECHANICAL TRANSMISSION
Filed Sept. 27, 1954
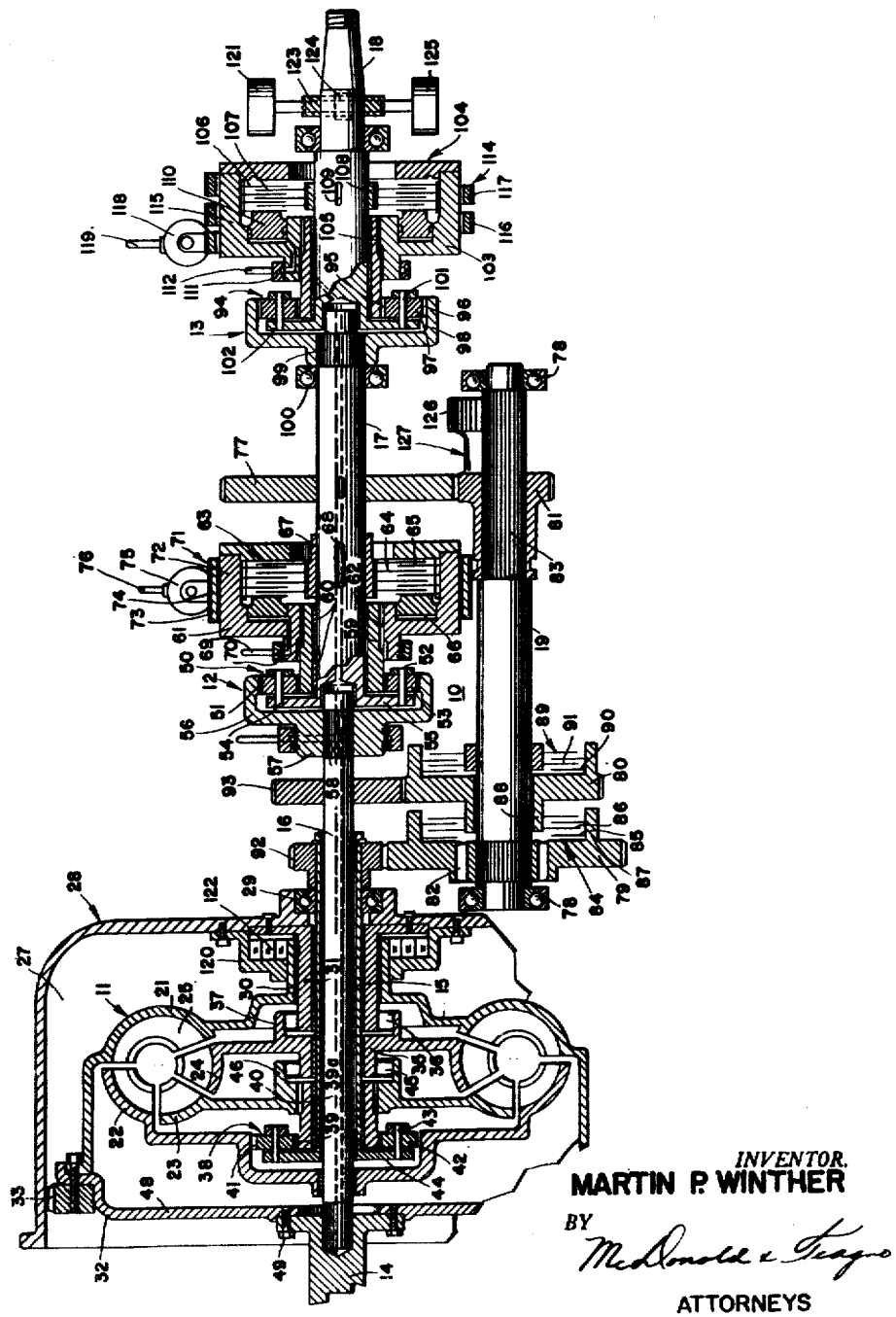
INVENTOR.
MARTIN P. WINTHER
BY
ATTORNEYS

United States Patent Office 2,812,670
Patented Nov. 12, 1957

2,812,670

HYDROMECHANICAL TRANSMISSION

Martin P. Winther, Gates Mills, Ohio, assignor to Eaton Manufacturing Company, Cleveland, Ohio, a corporation of Ohio Application September 27, 1954, Serial No. 458,624

12 Claims. (Cl. 74—720)

This invention relates to power transmissions for motor vehicles, and, as one of its objects, aims to provide a transmission mechanism intended for heavy duty service which will be very compact so as to require a minimum amount of space when used in a truck or the like, and in which a wide range of transmission ratios will be available to suit different operating conditions such that engine output and road speed of the vehicle can be maintained at maximum values at all times with minimum effort and fatigue for the driver. This application constitutes a continuation-in-part of my copending application Serial No. 438,253 for Hydromechanical Transmission for Vehicles, filed June 21, 1954.

Another object is to provide such a heavy-duty transmission employing a plurality of planetary gear sets in tandem relation affording a number of different transmission ratios and in which clutch means associated with control gear members of the planetary gear sets renders such gear sets selectively operable either in a so-called "locked-up" condition or as reduction gear devices.

A further object is to provide a transmission of this character in which such a plurality of planetary gear sets disposed in tandem relation are adapted to be connected with a power input means through a torque multiplier, preferably a hydraulic torque converter, so as to afford other transmission ratios in addition to those of the planetary gear sets.

Still another object is to provide a hydromechanical transmission employing such a combination of hydraulic torque converter and tandem planetary gear sets in which the tandem gear sets are adapted to be connected directly with an input means by a through shaft member and in which the torque output of the torque converter is delivered to the output shaft means through a countershaft.

Additionally, this invention provides such a hydromechanical transmission by which the torque converter can be used to provide dynamic braking in any of the cruising speeds of the transmission in addition to engine braking by reason of the direct connection of the planetary gear sets with the input means.

This invention can be further briefly summarized as consisting in certain novel combinations and arrangements of parts hereinafter described in detail and particularly set out in the claims hereof.

The accompanying drawing forming a part of this specification is a longitudinal section taken through a hydromechanical transmission embodying this invention.

As a preferred embodiment of the invention, the drawing shows a transmission 10 which comprises in general a torque multiplier in the form of a hydraulic torque converter 11 and a plurality of planetary gear units 12 and 13 disposed in a tandem relation to the torque converter. The transmission 10 also comprises coaxially aligned shafts 14, 15, 16, 17 and 18.

The shaft 14 is a rotatable input member such as the crankshaft or other power delivery shaft of a vehicle engine. The shaft member 15 is a hollow shaft through which the torque output of the hydraulic torque converter 11 is delivered. The shaft member 16 is a through shaft extending through the hollow shaft 15 and having splined connection with shaft 14 providing for the transmission of torque directly thereto from the input shaft 14 independently of the torque converter 11. The shaft 18 is the driven shaft of the gear unit 13 and constitutes the final output shaft which is adapted to be connected with the driving axle and traction wheels of the vehicle. The shaft 17 is the driven shaft of the gear unit 12 and is an intermediate shaft extending between the through shaft 16 and the output shaft 18.

In addition to the shaft members just above described, the transmission 10 also includes a countershaft 19 located in by-pass relation to the gear unit 12 and whose purpose will be further described hereinafter.

The hydraulic torque converter 11 comprises a group of relatively rotatable bladed annular members 21, 22, 23 and 24 disposed in cooperating relation and defining a toroidal fluid path or circuit 25.

The bladed member 21 is a pump member which is adapted to be driven by the vehicle engine for causing the hydraulic fluid to be propelled as a velocity stream around the toroidal fluid circuit 25. The bladed members 22 and 23 are turbine members adapted to be driven by the velocity stream and which can be conveniently referred to as first and second turbine members. The bladed member 24 is a reaction member located between the second turbine 23 and the inlet portion of the pump member 21 and whose reaction effect causes the velocity stream to be more effective on the turbine members 22 and 23. This reaction member also directs the fluid stream to the inlet portion of the pump member 21 after passing through the turbine members 22 and 23.

The torque converter 11 is rotatable in the chamber 27 of a stationary housing 28 from which the shaft members 15 and 16 project through the anti-friction bearing 29. The pump member 21 is provided with a central sleeve portion 30 by which this member is rotatably supported on an axially inwardly extending support sleeve 31 of the housing 28. The pump member 21 is rotatably driven by the input shaft 14 through a flywheel structure 32. A ring gear 33 carried by the flywheel structure 32 is adapted to be engaged by the driving pinion of a conventional starting motor.

The reaction member 24 is provided with a central sleeve portion 35 by which this member is rotatably mounted on the hollow shaft 15. The reaction member is inhibited against rotation in a reverse direction by a one-way brake 36. The one-way brake 36 is here shown as being of the roller type and is disposed between a sleeve portion 37 of the reaction member and the stationary mounting sleeve 31 of the housing 28.

The turbine members 22 and 23 are connected with the hollow shaft 15 for the delivery of torque thereto by means of a planetary gear set 38. This planetary gear set 38 comprises a sun gear 39, whose sleeve portion 39ᵃ is connected with the second turbine 23 by a splined connection 40, and a ring gear 41 carried by the first turbine 22. The planetary gear set 38 also comprises a group of planet pinion gears 42 located between and having meshing engagement with the sun and ring gears 39 and 41. The planet pinion gears 42 are rotatable on pivot pins 43 of the planet pinion carrier 44.

The sun gear 39 and the second turbine 23 are held against rotation in a reverse direction by a one-way brake device 45. This one-way brake 45 is here shown as being of the roller type whose rollers are disposed between the sleeve portion 35 of the reaction member 24 and a sleeve portion 46 of the second turbine. The planet pinion carrier 44 is formed on or connected with the hollow shaft 15 such that when the carrier is driven by the ring gear 41, or by the combined action of the ring gear and the sun gear 39, the hollow shaft will constitute the torque delivery shaft of the torque converter 11.

The flywheel structure 32 includes a drum member 48 secured to the input shaft 14 by screws 49 providing the driving connection between shaft 14 and pump member 21.

The planetary gearing 38 can be such as to have a torque amplification ratio of a desired value and the reaction member 24 can be such that by reason of its cooperation with the turbine members 22 and 23 the bladed members will also have a desired torque amplification ratio. The overall torque amplification ratio for the torque converter 11 can be, for example, a torque amplification ratio of 2.75 to 1.

The gear unit 12 comprises a planetary gear set 50 through which the intermediate shaft 17 is adapted to be driven by the shaft member 16. This planetary gear set 50 comprises sun and ring gears 51 and 52 and a group of planet pinion gears 53 disposed between and meshing with such sun and ring gears. The planet pinion gears 53 are rotatable on pivot pins 54 of a planet pinion carrier 55. The carrier 55 is formed on or connected with the forward end of the intermediate shaft 17.

The ring gear 52 of the planetary gear set 50 is carried by a housing 56 in which this gear set is located and which housing includes a hub portion 57. The housing 56 is mounted on the rear end of the shaft 16 which projects from the hollow shaft 15 and is connected with such projecting rear end by the splined connection 58.

The sun gear 51 of the planetary set 50 is carried by a sleeve 59 which is rotatably mounted on the shaft 17 by suitable bushings 60 and is connected with a rotatable housing 61 by a splined connection 62. A rotation control device in the form of a clutch device 63 is located in the housing 61 and comprises cooperating sets of clutch disks 64 and 65 and a clutch actuating piston means 66 slidably operable in the housing. The clutch disks 64 are carried by the clutch housing 61 and the clutch disks 65 are carried by a hub 67 which is secured on the shaft 17 as by means of a key 68.

When clutch actuating fluid is supplied to the clutch housing 61 through a supply pipe 69 and a gland 70, the piston means 66 applies pressure to the clutch disks for causing an engaged condition of the clutch 63. Such an engaged condition of the clutch 63 causes the sun gear 51 to be connected with the carrier 55 such that relative rotation therebetween is prevented and the planetary gear set 50 is then in the so-called locked-up condition, during which rotation of the housing 56 will cause the shaft 17 to be driven directly through the planetary gear set 50 at a 1 to 1 ratio.

The housing 61 of the clutch 63 also constitutes a part of a second rotation control device, namely, a brake device 71 of which it forms the brake drum 72. The brake device 71 also includes a brake band 73 extending around the drum 72 and carrying a friction lining 74 for engagement with such drum. The band 73 is adapted to be actuated by a suitable hydraulic cylinder device 75 for pressing the lining 74 into frictional engagement with the drum 72 to thereby produce an engaged condition of the brake device 71. Suitable actuating fluid for the cylinder device 75 can be supplied thereto through the pipe connection 76.

When the brake device 71 is in its engaged condition and the clutch device 63 is in its released condition, the housing 61 will be held against rotation and, likewise, the sun gear 51, such that the planetary gear set 50 will then be effective as a reduction gearing between the shaft 16 and the shaft 17. The planetary gear set 50 can have any suitable gear ratio such as a ratio of 1.25 to 1.

A gear 77 is provided having keyed or splined connection with shaft 17 for rotation therewith, the purpose of which will hereinafter appear.

The countershaft 19 is suitably supported by structure including the anti-friction bearings 78 and carries gears 79, 80 and 81, of which the gear 79 is one-way clutch 82 connected to the countershaft. Gear 80 is mounted for rotation on the countershaft and gear 81 is slidable on a splined portion 83 of the countershaft. A clutch device 84 including cooperating clutch disks 85 and 86 is provided between radially spaced axial portions 87 and 88 of the respective bodies of gears 79 and 80 permitting of coupling the gears together for unitary rotation, the purpose of which will hereinafter appear. A clutch device 89 similar to the clutch device 84 including disks 90 and 91 is provided for coupling gear 80 to countershaft 19 for rotation therewith, the purpose of which will hereinafter appear. Appropriate opeating means not shown, provides for a controlled operation of clutch devices 84 and 89. The gear 79 is in meshed engagement with a gear 92 having a splined connection with the rear end of the hollow shaft 15. Gear 80 is in meshed engagement with a gear 93 having a splined connection with shaft 16, axially intermediate gear 92 and planetary gear set 50. The gears 93 and 80 can have any desired ratio such as a ratio of 1 to 1.76. The gears 92 and 79 can have any desired ratio such as a ratio of 1 to 2.06. The gear 81 is shiftable on the splined shaft portion 83 either manually or automatically so as to have a forward driving position in engagement with the gear 77 at a ratio of 3 to 2, as shown in the drawing, or a reverse driving position in engagement with a reverse idler gear 126 of a gear cluster 127. Gear cluster 127 includes in addition to gear 126 a counterpart gear of smaller diameter than gear 126, not shown, of conventional make having meshing engagement with gear 77.

The gear unit 13 comprises a second planetary gear set 94 by which the output shaft 18 is adapted to be connected with the shaft 17 of the gear unit 12. The planetary gear set 94 comprises sun and ring gears 95 and 96 and a group of planet pinion gears 97 disposed between and in meshed engagement with such sun and ring gears. The ring gear 96 is carried by a rotatable housing 98 in which this planetary gear set is located and which housing is driven by the shaft 17 through a splined connection 99. The housing 98 and the rear end of the shaft 17 are suitably supported as by means of an anti-friction bearing 100. The planet pinion gears 97 are rotatably supported by pivot pins 101 of a planet pinion carrier 102.

The sun gear 95 is connected with the housing 103 of a rotation control device in the form of a clutch device 104 by a splined connection 105. The clutch device 104 comprises sets of cooperating clutch disks 106 and 107, of which the clutch disks 106 are carried by the clutch housing 103 and the disks 107 are carried by a clutch hub 108 which is secured to the shaft 18 as by means of the key 109. A piston means 110 operable in the clutch housing 103 is adapted to apply pressure to the clutch disks 106 and 107 to produce an engaged condition of the clutch device 104. Clutch actuating fluid is adapted to be supplied to the clutch housing 103 through a gland 111 and a pipe 112 connected with such gland.

The planet pinion carrier 102 is formed on or connected with the forward end of the output shaft 18. When the clutch device 104 is thus engaged by actuation of the piston means 110, the sun gear 95 will be connected with the planet pinion carrier 102 such that relative rotation between these members is prevented and the planetary gear set 94 will then be in the so-called locked-up condition. When this planetary gear set is in such a locked-up condition, it transmits torque directly from the shaft 17 to the output shaft 18 at a 1 to 1 ratio.

The clutch housing 103 also constituted a part of a rotation control device in the form of a brake device 114 in which it forms a brake drum 115. The brake device 114 also comprises a helical brake band 116 disposed around the brake drum 115 and a friction lining 117 carried by such band and adapted to be pressed thereby against the brake drum. Contracting movement is adapted to be imparted to the band 116 by a suitable cylinder device 118 to which actuating fluid is adapted to be supplied through the pipe 119.

When the band 116 is thus contracted around the drum 115 by the cylinder device 118 while the clutch device 104 is in its released condition, an engaged condition of the brake device 114 is produced by which the housing 103 and the sun gear 95 are held against rotation. When the sun gear 95 is held stationary, the planetary gear set 94 will operate as a reduction gearing in transmitting torque from the shaft 17 to the output shaft 18. This planetary gear set can have any desired torque amplification ratio such as a ratio of 1.56 to 1.

The hydraulic actuating fluid for the clutch devices 63, 84, 89 and 104 and for the cylinder devices 75 and 118 of the brake devices 71 and 114 can be obtained from any suitable pressure source such as the oil pumps 120 and 121. The pump 120 is here shown as being located in the housing 28 of the torque converter 11 and as having a rotor 122 which is driven by the sleeve portion 30 of the pump member 21. The pump 121 is here shown as being driven by the output shaft 18 through cooperating gear members 123 and 124. A governor device 125 is located adjacent the pump 121 and is also driven from the output shaft 18 through the gear members 123 and 124.

From the foregoing description and the accompanying drawings, it will now be readily seen that this invention provides a very practical hydromechanical transmission of a relatively simple and compact construction and by which a wide range of transmission ratios will be available to suit different vehicle operating conditions such that engine output and road speed can be maintained at maximum values at all times with minimum effort and fatigue for the driver.

It will now also be seen that the planetary gear sets of the gear units 12 and 13 will provide six different transmission ratios for cruising operation of the vehicle. On the basis of the gear ratios already mentioned herein, these cruising ratios will consist of a low-gear cruising ratio of 4.13 to 1, a second gear cruising ratio of 2.65 to 1, a third-gear cruising ratio of 1.95 to 1, a fourth-gear cruising ratio of 1.56 to 1, a fifth-gear cruising ratio of 1.25 to 1 and a high-gear or direct cruising ratio of 1 to 1.

The low-gear cruising ratio is obtained by way of shaft 16 being connected directly with the input shaft 14, with clutch 89 engaged providing for a transmission of power, by way of meshed gears 93 and 80, to the countershaft, through the countershaft 19 and the meshing gears 81 and 77 to shaft 17, and thence to shaft 18 by way of planetary gear 94, with brake band 116 closed and clutch 104 disengaged. During this condition of operation planetary gear set 94 is operating as a reduction gearing. Second-gear cruising ratio is obtained with clutches 89 and 104 engaged and brake band 116 opened, providing for power flow from shaft 14, through shaft 16, meshed gears 93 and 80, clutch 89 to countershaft 19, through countershaft 19 and meshed gears 81 and 77 to shaft 17, and thence from shaft 17 by way of the locked up planetary gear set 94 to output shaft 18.

The third-gear cruising ratio is obtained with the brake bands 71 and 116 closed, and clutches 63 and 104 disengaged, such that power flows from shaft 14, through shaft 16, through the reduction gearing of planetary gear set 50, and through shaft 17 and the reduction gearing of planetary gear set 94 to shaft 18.

Fourth-gear cruising ratio is obtained with clutch 63, engaged, with brake band 116 closed, clutch 104 disengaged and brake band 71 opened. As such power flows from shaft 14, through shaft 16, through locked-up planetary gear set 50 to shaft 17 and thence by way of the reduction gearing of planetary gear set 94 to output shaft 18. The fifth-gear cruising ratio is obtained with brake band 71 closed, clutch 104 engaged, brake band 116 opened and with clutch 63 disengaged, whereas the sixth-gear cruising ratio is obtained with clutches 63 and 104, engaged and with brake bands 71 and 116 opened. As such power flow for fifth-gear cruising is from shaft 14, through shaft 16, through the reduction gearing of planetary gear set 50, through shaft 17 and thence through locked-up planetary gear set 94 to shaft 18. Power flow for sixth-gear or direct drive cruising is from shaft 14, through shaft 16, and thence through locked-up planetary gear set 50, through shaft 17 and locked-up planetary gear set 94 to shaft 18.

The additional gear ratios provided by the hydraulic torque converter 11 can be referred to as a standard low-gear ratio and an emergency low-gear ratio. On the basis of the gear ratios mentioned above for the torque converter 11 and for the paired gear members 92, 79 and 81, 77, the standard low-gear ratio for the transmission 10 will be a ratio ranging between approximately 8.5 to 1 at stall and 3.1 to 1. This range of standard low-gear ratios is obtained when the clutch device 104 is engaged and brake band 116 is opened. During this condition of operation, the torque converter 11 is effective and its torque output is delivered to the shaft 17 through the hollow shaft 15, the paired gears 92 and 79, from gear 79 to the countershaft 19 by way of one-way clutch 82, the countershaft 19, the paired gears 81 and 77, and through locked-up planetary gear set 94 to the output shaft 18.

The emergency low-gear ratio is a ratio ranging between approximately 13.2 to 1 at stall and 4.85 to 1. This range for the emergency low-gear ratio is obtainable when the brake band 114 is closed and clutch device 104 is disengaged. During this condition of operation the torque output of the hydraulic torque converter 11 is being delivered to the shaft 17 through the countershaft 19 and is then transmitted to the output shaft 18 through the planetary gear set 94 while the latter is operating as a reduction gearing.

As is understood by those skilled in the transmission art, the characteristics of the hydraulic torque converter 11 are such that during the starting or stall condition of operation, the first turbine 22 will be rotated at a relatively high rate of speed by the velocity stream of hydraulic fluid, and, acting through the planetary gear set 38, will deliver through the hollow shaft 15 a high value of starting torque. When this torque output of the torque converter is further amplified by the paired gears 92, 79 and 81, 77 and by the planetary gear set 94 of the gear unit 13, it may be as high as the above-mentioned high value of the emergency low-gear ratio of 13.2 to 1. As the speed of the input shaft 14 increases, rotation of the second turbine 23 will also increase and the resulting torque amplification of the torque converter 11 will decrease such that the emergency low-gear ratio will decrease to the above-mentioned low of 4.85 to 1 value. Similarly, the torque amplification ratios afforded by the torque converter 11, when the planetary gear set 94 is in its locked-up condition for the standard low-gear ratio mentioned above, will vary between the above-mentioned upper and lower ratio values of 8.5 to 1 and 3.1 to 1. Reverse is obtained by way of the torque converter, shaft 15, meshing gears 92 and 79, one-way clutch 82 coupling gear 79 to countershaft 19, from countershaft 19 by way of gear 83 shifted to engage reverse idler gear 126 and by way of engagement of the counterpart of gear 126, not shown, meshing with gear 77, and thence by way of shaft 17 to shaft 18 through planetary gear set 94 in locked up condition. This arrangement for reverse provides a ratio of approximately 9 to 1.

In addition to normal engine braking which is obtainable through the gearing of the transmission by way of shafts 18, 17 and 16 for all cruising speeds of the transmission, dynamic braking is simultaneously possible upon closing of clutch 84 to thus provide a reverse power flow from the output shaft 18 to the torque converter by way of shaft 15. The difference in the ratio of the driving gears coupled by clutch 84 is sufficient to cause a differential value in rotation of the input and output members of the torque converter, such that for example when descending a hill in direct drive, a brake action is obtained by driving the torque converter driven members 22 and 23 faster than the pump 21 driven directly from input shaft 14. By changing the ratios of meshing gears 92 and 79, and/or meshing gears 93 and 80, and/or meshing gears 81 and 77 the dynamic brake effect can be determined so as to select maximum values of braking consistent with axle capacity or other design requirements.

Although, not shown, it is contemplated that clutch 84 will be controlled by an engine operated governor at engine overspeed of say approximately 15%, to thus prevent vehicle run away on grades.

Although the hydromechanical transmission of this invention has been illustrated and described herein to a somewhat detailed extent, it will be understood, of course, that the invention is not to be regarded as being limited corespondingly in scope, but includes all changes and modifications coming within the spirit of the invention and the scope of the claims hereof.

What I claim is:

1. In a power transmission mechanism, a rotatable input means including a pair of concentric rotatable shafts, a shaft to be driven, a planetary gear set connecting said shaft with said input means, a countershaft driven by one of said rotatable shafts and disposed in by-pass relation to said gear set, a drive gear splined on said shaft, reverse idler gear means having driving cooperation with said drive gear, a gear splined on said countershaft, said gear on said countershaft being shiftable thereon for driving cooperation with either said drive gear or said reverse idler gear means, a driven gear rotatable about said countershaft, a gear, rotatable with the other of said rotatable shafts, meshing with said driven gear and a one-way clutch adapted to drivingly connect said driven gear with said countershaft during the transmission of torque to said shaft from said input means.

2. In a power transmission mechanism according to claim 1 wherein a gear is connected to said one rotatable shaft for rotation therewith, a second gear is rotatable about said countershaft, having meshing engagement with said gear connected to said one rotatable shaft and a clutch device is provided operable to connect together, for unitary rotation, said gears rotatable about said countershaft during the transmission of torque from said shaft to said input means.

3. In a power transmission mechanism according to claim 2 wherein a clutch devise is provided operable to connect together, for unitary rotation, said second gear and countershaft.

4. In a power transmission mechanism, a rotatable input means, a shaft to be driven, a planetary gear set connecting said shaft with said input means and comprising cooperating gear members including a control gear member, rotation control means effective on said control gear member for selectively rendering said gear set operable either in a locked-up condition or as a reduction gearing, a countershaft driven by said input means and disposed in by-pass relation to said gear set, a drive gear splined on said shaft, a reverse idler gear means having driving cooperation with said drive gear, a gear splined on said countershaft and shiftable thereon for driving cooperation with either said drive gear or said reverse idler gear means, a gear rotatable about said countershaft, a gear, rotatable with said input means, meshing with said gear rotatable about said countershaft and a one-way clutch adapted to drivingly connect said gear rotatable about said countershaft with said countershaft during the transmission of torque to said shaft from said input means.

5. In a power transmission mechanism, a rotatable input means, a shaft to be driven, a planetary gear set connecting said shaft with said input means and comprising cooperating gear members including a control gear member, a pair of rotation control devices effective on said control gear member for selectively rendering said gear set operable either in a locked-up condition or as a reduction gearing, one device of said pair being a clutch device which is effective when engaged to connect said control gear member with said shaft for said locked-up condition and the other device of said pair being a brake device which is effective when engaged to hold said control gear member against rotation for operation of the gear set as a reduction gearing, a countershaft driven by said input means and disposed in by-pass relation to said gear set, a drive gear splined on said shaft, reverse idler gear means having driving cooperation with said drive gear, a gear splined on said countershaft and shiftable thereon for driving cooperation with either said forward drive gear or said reverse drive gear, a gear rotatable about said countershaft, a gear, rotatable with said input means, meshing with said gear rotatable on said countershaft and a one-way clutch adapted to drivingly connect said gear rotatable about said countershaft with said countershaft during the transmission of torque to said shaft from said input means.

6. In a power transmission mechanism according to claim 4 wherein a second gear is connected to said input means for rotation therewith, a second gear is rotatable about said countershaft, having meshing engagement with said second gear connected to said input means and a clutch device is provided operable to connect together, for unitary rotation, said gears rotatable about said countershaft during the transmission of torque from said shaft to said input means.

7. In a power transmission mechanism according to claim 6 wherein a clutch device is provided operable to connect together, for unitary rotation, said second gear and said countershaft.

8. In a hydromechanical transmission, a rotatable input member, a hydraulic torque converter, a pair of first and second rotatable shaft members of which the first shaft member is connected directly with said input member and the second shaft member is adapted to be driven from said input member through said torque converter, a rotatable shaft to be driven, a planetary gear set connecting the last-mentioned shaft with said first shaft member and comprising cooperating gear members including a control gear member, rotation control means effective on said control gear member for selectively rendering said gear set operable either in a locked-up condition or as a reduction gearing, a countershaft driven by said second shaft member and disposed in by-pass relation to said gear set, a drive gear splined on said shaft, reverse idler gear means having driving cooperation with said drive gear, a gear splined on said countershaft and shiftable thereon for driving cooperation with either said drive gear or said reverse idler gear means, a gear rotatable on said countershaft, a gear, rotatable with said second shaft, meshing with said gear rotatable on said countershaft and a one-way clutch adapted to drivingly connect said gear rotatable on said countershaft with said countershaft during the transmission of torque to said shaft from said input means.

9. In a hydromechanical transmission, a rotatable input member, a hydraulic torque converter, a pair of first and second rotatable shaft members of which the first shaft member is connected directly with said input member and the second shaft member is adapted to be driven from said input member through said torque converter, a rotatable intermediate shaft, a rotatable output shaft, first and second planetary gear sets connecting said intermediate and output shafts with said first shaft member in tandem relation thereto and comprising cooperating gear members including control gear members, a countershaft means connecting said intermediate shaft with said second shaft in bypass relation to said first planetary gear set, and rotation control devices effective on said control gear members for selectively rendering said gear sets operable either in a locked-up condition or as reduction gear devices, the connection between said intermediate shaft and countershaft means including meshing gears and one-way clutch means coupling one of said meshing gears with the countershaft means.

10. In a hydromechanical transmission, a rotatable input member, a hydraulic torque converter, a pair of first and second rotatable shaft members of which the first shaft member is connected directly with said input member and the second shaft member is adapted to be driven from said input member through said torque converter, a rotatable intermediate shaft, a rotatable output shaft, first and second planetary gear sets connecting said intermediate and output shafts with said first shaft member in tandem relation thereto and comprising cooperating gear members including control gear members, rotation control devices effective on said control gear members for selectively rendering said gear sets operable either in a locked-up conidition or as reduction gear devices, a countershaft driven by said second shaft member and disposed in by-pass relation to said first gear set, a drive gear splined on said intermediate shaft, reverse idler gear means having driving cooperation with said drive gear, a gear splined on said countershaft and shiftable thereon for driving cooperation with either said drive gear or said reverse idler gear means, a gear rotatable about said countershaft, a gear, rotatable with said second shaft, meshing with said gear on said countershaft, and a one-way clutch adapted to drivingly connect said drive gear with said intermediate shaft during the transmission of torque to said intermediate shaft from said second shaft member.

11. In a hydraulic transmission according to claim 10 wherein a gear is connected to said first shaft member, a second gear is rotatable about said countershaft, and a clutch device is provided operable to connect together, for unitary rotation, said gears rotatable about said countershaft during the transmission of torque from said intermediate to said second shaft.

12. In a hydraulic transmission according to claim 11 wherein a clutch device is provided operable to connect together, for untiary rotation, said second gear and said countershaft.

References Cited in the file of this patent

UNITED STATES PATENTS

| | | |
|---|---|---|
| 1,648,969 | Stewart | Nov. 15, 1927 |
| 2,355,709 | Dodge | Aug. 15, 1944 |
| 2,376,545 | Livermore | May 22, 1945 |
| 2,561,499 | Cohen | July 24, 1951 |
| 2,593,629 | Swift | Apr. 22, 1952 |
| 2,637,217 | Taylor | May 5, 1953 |
| 2,689,030 | Wemp | Sept. 14, 1954 |

U. S. DEPARTMENT OF COMMERCE
PATENT OFFICE

CERTIFICATE OF CORRECTION

Patent No. 2,812,670

November 12, 1957

Martin P. Winther

It is hereby certified that error appears in the printed specification of the above numbered patent requiring correction and that the said Letters Patent should read as corrected below.

Column 7, lines 29 and 30, strike out "shaft with said input means, a countershaft driven by one of said rotatable shafts" and insert instead --shaft with one of said rotatable shafts, a countershaft driven by said input means--.

Signed and sealed this 25th day of February 1958.

(SEAL)
Attest:

KARL H. AXLINE
Attesting Officer

ROBERT C. WATSON
Commissioner of Patents